Patented Apr. 2, 1929.

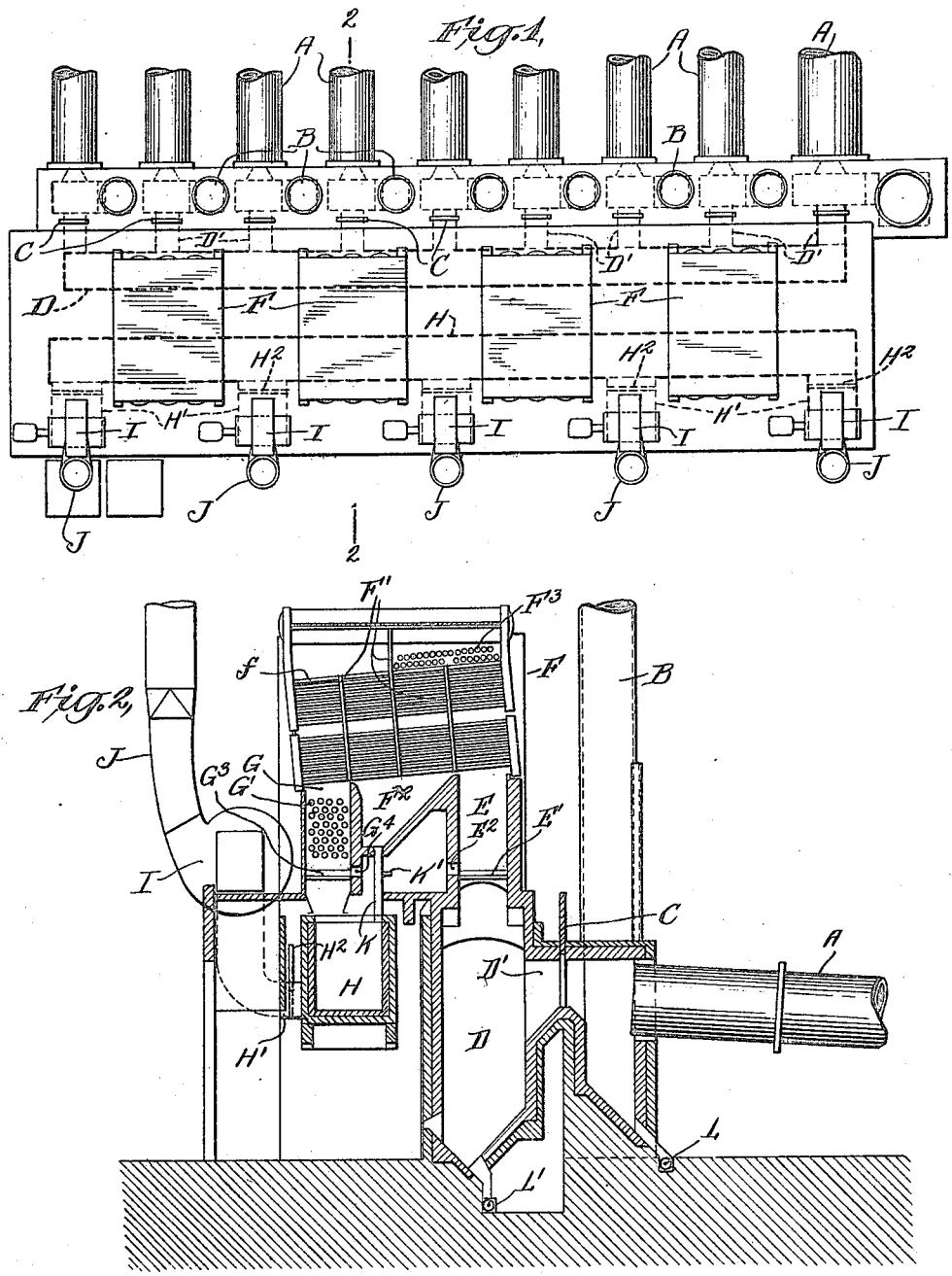

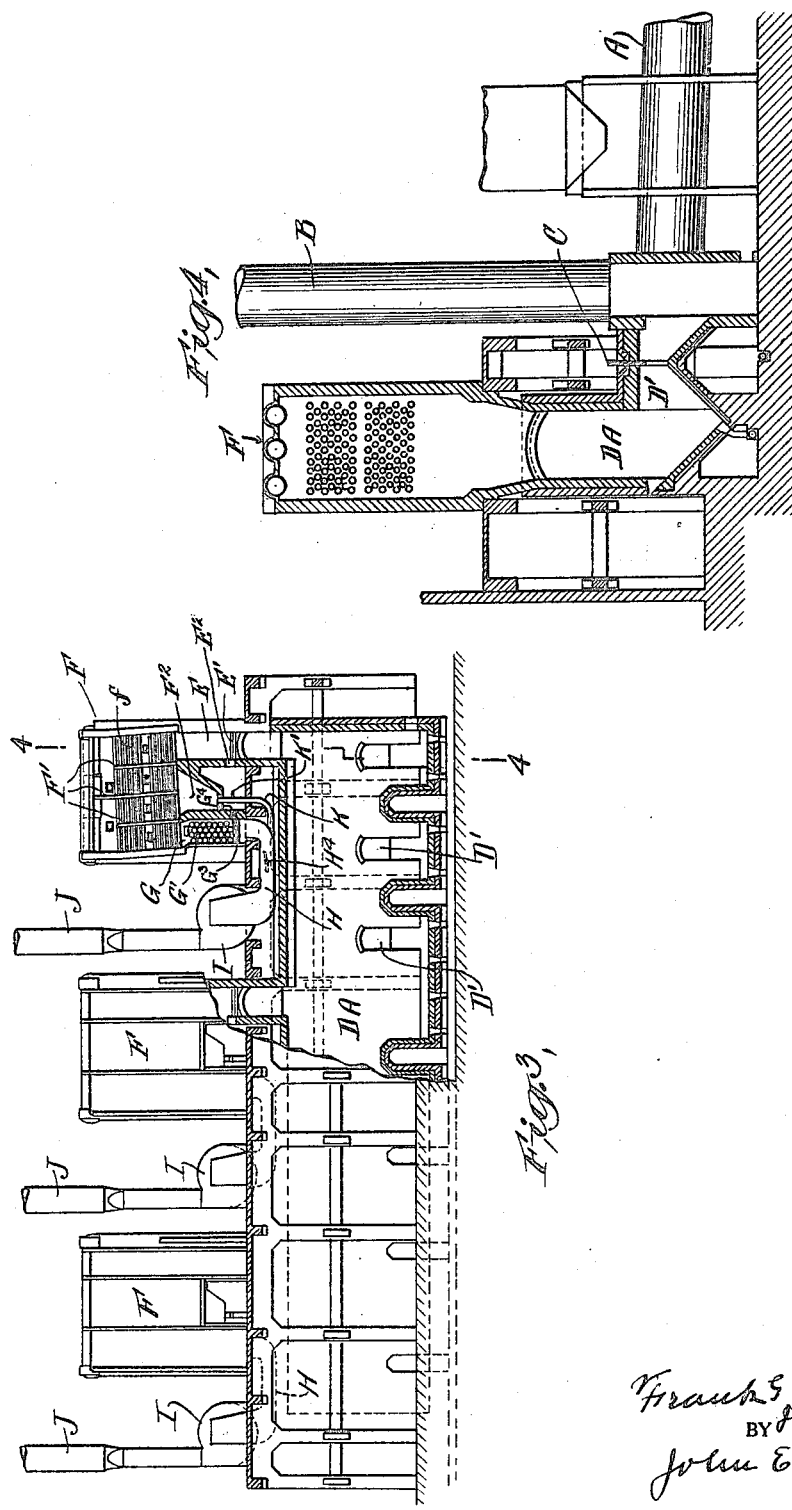

1,707,964

UNITED STATES PATENT OFFICE.

FRANK G. McKELVY, OF EASTON, PENNSYLVANIA, AND JOHN E. BELL, OF BROOKLYN, NEW YORK; LOLA R. BELL EXECUTRIX OF SAID JOHN E. BELL, DECEASED.

WASTE-HEAT-BOILER PLANT.

Application filed November 17, 1923. Serial No. 675,382.

Our present inventions relates to waste heat boiler plants for utilizing the available heat in hot gases heavily laden with dust discharged from industrial furnaces and was primarily devised, and is especially adapted for use in a plant in which the boiler heating gases come from rotary cement kilns. The general object of our present invention is to provide an improved arrangement of the boilers and the heating gas flues, dampers, draft creating provisions, and dust removing provisions required for efficient operation in accordance with present day engineering practice. More specifically the object of our invention is to provide a novel arrangement of the above mentioned parts characterized by its compactness and economy in floor space, and by its tendency to minimize the furnace dust accumulation in the boilers proper.

The various features of novelty which characterize our invention are pointed out with particularity in the claims annexed to and forming a part of this specification. For a better understanding of the invention, however, its advantages and specific objects attained with its use, reference should be had to the accompanying drawings and descriptive matter in which we have illustrated and described preferred embodiments of our invention.

Of the drawings:

Fig. 1 is a diagrammatic plan view of a portion of a cement kiln waste heat plant;

Fig. 2 is a section on the line 2—2 of Fig. 1;

Fig. 3 is an elevation, partly in section, illustrating a modified construction; and Fig. 4 is a section taken on the line 3—3 of Fig. 3.

In the plant illustrated in Figs. 1 and 2, each of a battery of rotary cement kilns A normally discharges its hot gases through an individual outlet D' into a common bus flue D. In accordance with the usual practice, seats or guideways are provided for damper or valves C for closing each of the various connections D' when necessary, and a stack B is provided for each kiln A, but is normally connected thereto only when the corresponding connection D' is closed. From the flue D, heating gases pass to the various waste heat boilers F through an individual gas heating outlet E for each boiler. The flue D forms a gas collecting and distributing flue—normally collecting the waste gases issuing from a plurality of kilns A, and distributing the gases so collected among a plurality of boilers F. The boilers F are shown as transversely baffled four pass water tube boilers of a type well known and in general use in waste heat boiler plants, but the arrangement of the boilers relative to the flue D is different from that heretofore employed.

In accordance with the present invention, each boiler F is connected to the flue D through a corresponding outlet E which leads vertically upward from the roof of the flue D, and in effect forms a downward continuation of the first pass of the boiler proper. In the form of our invention shown in Figs. 1 and 2, the boiler water tubes $f$ extend transversely to the length of the flue D, and the final pass of each boiler communicates at its lower end through a downcomer conduit G with a common flue H parallel to the flue D. The draft creating means connected to the flue H comprise a plurality of exhaust fans I each having a separate inlet connection to the flue H with a cut-off damper $H^2$ therein. Each fan I is connected to an individual discharge stack J. Each boiler F is formed with a dust pocket $F^2$ from the sides of which the transverse boiler baffles F' extend upward across the tubes $f$ so that the pocket $F^2$ receives the dust settling out of the heating gases in the second and third passes of the boiler. Each dust pocket $F^2$ is connected by one or more conduits K to the flue H. On account of the difference in draft suction in the flue H and dust pocket $F^2$ the conduits K are normally closed as by means of the cut-off damper K'. The dampers K' are opened from time to time as required to discharge the accumulated dust from the pockets $F^2$ into the flue H, in which the gas velocity is high enough, so that this dust is sucked out by the fans I and discharged to the atmosphere through the stacks J. The usual dust conveyors L and L' are provided for removing the dust accumulating in the passages D' at the inlet sides of the dampers C and accumulating in the bus flue D. Advantageously an economizer G' for preheating the boiler feed water is provided in each downcomer conduit G. Suitable provisions should be made for closing the various flues E and G so that each boiler may be opened up for repairs or other purposes without disturbing the draft conditions in the flues D and H. These provisions may comprise supports E' in the flues E for asbestos board damper plates insertable and removable through normally closed doorways E² in the sides of the flues E and similar supports G³ and doorways G⁴ for the flues G.

With the described arrangement there is an obvious and substantial economy in the floor space required by a plant of given capacity and some shortening in the flue connections. Furthermore, the arrangement of the first pass of the boiler above the flue D and connected thereto by the vertical flue portion E gives a desirably great vertical depth from the bottom of the boiler first pass to the bottom of the flue D, through which dust may settle out of the heating gases before the gases enter the boiler and all of the dust settling out of the gases in the first boiler pass and in the flue E may be eventually removed by the dust removing provisions L' at the bottom of the flue D which must be provided in any event.

The importance of the reduction in the amount of dust carried into the boiler proper, made possible by our invention will be appreciated when account is taken of the fact that in the operation of an ordinary cement kiln waste heat boiler system as heretofore constructed the amount of dust carried through each boiler unit of ordinary size frequently amounts to twenty tons per day. Most of the dust thus carried through the boilers is discharged into the atmosphere by the draft creating exhausters. The discharge of such large quantities of dust into the atmosphere involves a serious wastage and is objectionable, of course, for its effect on atmospheric conditions in the neighborhood of the plant. With the present invention the increased amount of dust deposited in the bus flue and thereby prevented from entering the boilers may be recovered and utilized. A further advantage of our invention arises from the fact that from time to time considerable quantities of carbon monoxide passes to the distribution flue from the kilns. The combustion of this gas in the main flue sinters the dust and the first deposit of the sinter dust on the boiler tube surface adheres and forms a hard incrustation or scale. With the branch flues running upward to the boilers in accordance with the present invention, not only does the sintered dust have greater opportunity to settle out of the gases before reaching the boiler, but the carbon monoxide gas will be burned more quickly and the localized heat of this combustion will be dissipated in the main flue and the branches leading upward to the boilers, thus reducing the tendency to sintered incrustation on the boiler tubes. Since the gases heated by the combustion in the main flue rise naturally, the formation of gas streams of high velocity that would carry the oxidizing gases in their nascent condition into the boiler tubes is largely avoided.

A still more compact arrangement of the boilers and flues is shown in the form of our invention illustrated in Figs. 3 and 4 wherein the boilers F are arranged above a flue DA with the boiler water tubes $f$ generally parallel to the flue. The latter may be generally like the flue D above described in construction and in the manner of its connection to the kilns A. The bus flue H provided between the draft creating devices and the boilers in Figs. 1 and 2, is omitted in the construction shown in Figs. 3 and 4, and in the latter figures each boiler is provided with an individual exhaust stack J and fan I and the latter is connected to the lower end of the corresponding flue G by a passage H³ parallel to and immediately above the flue DA. A damper H⁴ is provided in each fan inlet H³.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention what we claim as new and desire to secure by Letters Patent, is:

1. A waste heat boiler system for utilizing the heat in waste gases having a high dust content comprising a plurality of horizontal water tube boilers, a collecting and distributing flue extending transversely of and beneath said boilers, and elongated vertical gas flues leading upward from said distributing flue to each of said boilers of sufficient length to permit a large portion of the dust in the waste gases settling out before said gases contact with the boiler tubes.

2. A waste heat boiler system for utilizing the heat in waste gases having a high dust content comprising a plurality of horizontal water tube boilers, a collecting and distributing flue extending transversely of and beneath the first gas pass of each of said boilers, an elongated vertical conduit connecting said distributing flue with each of said first passes, and provisions in said distributing flue for removing dust settling out of the waste gases in said vertical flues.

3. In a waste heat boiler system for utilizing the heat in waste gases having a high dust content comprising a collecting and distributing flue for the heating gases, a plurality of boiler units receiving heating gases from said flue and a second flue alongside the first mentioned flue and receiving the gases from the boilers and draft suction creating devices connected to the last mentioned flues, the improvement which consists in the arrangement of the boilers directly above said flues and separate vertical gas conduits leading upward from each of said flues to each boiler.

4. In a waste heat boiler system for cement kilns comprising a collecting and distributing heating gas flue, a plurality of transversely baffled water tube boiler units arranged directly above said flue, vertical gas outlet flues leading directly upward from the distributing flue to the different boilers, and dust collecting and disposing means in the bottom of said flue and beneath the water tubes of each boiler.

Signed by FRANK G. McKELVY at Easton, in the county of Northampton and State of Pennsylvania, this 5th day of November, A. D. 1923.

FRANK G. McKELVY.

Signed by JOHN E. BELL, at New York, in the county of New York and State of New York, this 8th day of November, A. D. 1923.

JOHN E. BELL.